United States Patent [19]

Toyoda et al.

[11] Patent Number: 4,647,827
[45] Date of Patent: Mar. 3, 1987

[54] ABSOLUTE POSITION DETECTING SYSTEM FOR SERVOCONTROL SYSTEM

[75] Inventors: Kenichi Toyoda; Hideo Miyashita, both of Hino; Shinsuke Sakakibara, Komae; Hatsumi Naruo, Hino, all of Japan

[73] Assignee: Fanuc Ltd., Minamitsuru, Japan

[21] Appl. No.: 865,944

[22] PCT Filed: Apr. 11, 1984

[86] PCT No.: PCT/JP84/00184
§ 371 Date: Dec. 11, 1984
§ 102(e) Date: Dec. 11, 1984

[87] PCT Pub. No.: WO84/04161
PCT Pub. Date: Oct. 25, 1984

Related U.S. Application Data

[63] Continuation of Ser. No. 700,887, Dec. 11, 1984, abandoned.

[30] Foreign Application Priority Data

Apr. 11, 1983 [JP] Japan ............................. 58-063332

[51] Int. Cl.$^4$ .............................................. G05B 11/18
[52] U.S. Cl. .................................... 318/592; 318/625; 318/661; 318/594; 318/595

[58] Field of Search ............... 318/592, 593, 594, 569, 318/661, 600, 625, 595

[56] References Cited

U.S. PATENT DOCUMENTS

| | | | |
|---|---|---|---|
| 3,151,282 | 9/1964 | Fisher | 318/592 |
| 3,673,585 | 6/1972 | Tripp | 318/595 X R |
| 4,023,085 | 5/1977 | Bishop | 318/661 |
| 4,207,505 | 6/1980 | Falk et al. | 318/595 |
| 4,310,790 | 1/1982 | Marquis | 318/661 X R |
| 4,339,708 | 7/1982 | Desbiens et al. | 318/661 X R |
| 4,529,922 | 7/1985 | Ono | 318/661 X R |

Primary Examiner—Benjamin Dobeck
Attorney, Agent, or Firm—Staas & Halsey

[57] ABSTRACT

An absolute position detecting system for a servocontrol system which has its operation controlled in accordance with a numerical control program. Resolvers 202 and absolute encoders 110 made rotatable with a servomotor 105, are set at a predetermined revolving ratio so that the absolute positions of operating axes may be detected highly accurately from the revolution outputs of the two. The detecting operations can be performed for the plural operating axes by using one detecting circuit commonly.

4 Claims, 6 Drawing Figures

4,647,827

ABSOLUTE POSITION DETECTING SYSTEM FOR SERVOCONTROL SYSTEM

This is a continuation of co-pending application Ser. No. 700,887 filed on Dec. 11, 1984 now abandoned.

CROSS-REFERENCED TO RELATED APPLICATION

This application is related to U.S. application Ser. No. 688,049, filed Dec. 11, 1984 (now U.S. Pat. No. 4,575,666) which is assigned to the assignee of the subject application.

BACKGROUND OF THE INVENTION

This invention relates to a system for detecting the absolute position of each of a plurality of operating axes by servo-controlling a servomotor and, more particularly, to an absolute position detecting system for a servocontrol system which is operative to detect the absolute positions of the operating axes on the basis of the respective detected outputs of resolvers and absolute encoders made rotatable at a predetermined speed ratio together with the servomotor, so that the detections of those absolute positions can be selectively performed for the respective operating axes.

In order to position a moving part of an industrial robot or the like with a high degree of accuracy, servomotors subject to servocontrol are widely used.

FIG. 1 is a block circuit diagram for explaining servocontrol, showing an example in which the operating axes of an industrial robot or the like are positionally controlled by an NC (numerical control) apparatus. In FIG. 1: reference numeral 101 indicates a paper tape which is punched with numeral control (NC) command data such as positioning information for machining or M, S, T function information; and numeral 102 indicates an NC apparatus for enabling a tape reader (described below) to read NC data from the paper tape 101, decode the NC data read from the paper tape 101 to send out the data (e.g., if the data are the M, S and T function commands), to a machine or to output the same, or if they are moving commands Zc, to a pulse distributor at a later stage. The NC apparatus 102 comprises a processor 102a for executing arithmetic processings in accordance with a control program; a program memory 102b for storing a predetermined control program; a data memory 102c for storing data; an operator's panel 102d for effecting control operations; a tape reader/puncher 102e; a display 102f; an input/output port 102g; a present position counter 102h; and an address/data bus 102j connecting them.

Indicated at numeral 103 is a pulse distributor which executes a well-known pulse distribution arithmetic operation on the basis of the moving commands Zc, to generate distributed pulses Ps having a frequency dependent on a command speed. A well-known acceleration/deceleration circuit 104 accelerates the pulse speed of the distributed pulse train Ps linearly when this pulse train is generated, or decelerates the same linearly at the end of said pulse train to generate a pulse train Pi. A motor 105 drives an operating axis, and a pulse coder 106 generates one feedback pulse FP each time the motor 105 rotates through a predetermined interval. An error computing memory 107 which is constructed of a reversible counter, for example, stores the difference or error Er between the number of the input pulses Pi generated by the acceleration/deceleration circuit 104 and the number of the feedback pulses FP. Incidentally, that error computing memory is constructed, as shown, of an arithmetic circuit 107a for computing the difference between Pi and FP, and an error register 107b for storing the error Er. Specifically, the error computing memory 107 counts up the input pulses Pi each time they are generated, if the motor 105 is commanded to revolve forward so that it is revolving in accordance with the command, and counts down the content of the feedback pulses FP each time they are generated, thereby to store the error Er between the input pulse number and the feedback pulse number in the error register 107b. Numeral 108 indicates a digital-analog (DA) converter for generating an analog voltage proportional to the content of the error register 107b, and numeral 109 indicates a speed control circuit. Incidentally, the error computing memory 107 and converter 108 together form a motor position controller.

Next, the operations of the construction of the conventional example of FIG. 1 will be described in the following.

Prior to machining, first of all, the NC data of the paper tape 101 are read out by the tape reader/puncher 102e and are stored in the data memory 102c through the bus 102j. Next, when the start command is inputted through the bus 102j to the processor 102a by operating the operator's panel 102d, the processor 102a sequentially reads out and executes the machining control program of the program memory 102b. Specifically, the processor reads out not only the NC data of the data memory 102c but also necessary parameters (such as NC parameters, feed speeds or machining voltages) to prepare an X-axis moving command Xc and a Y-axis moving command Yc for moving the moving part of the machine in directions X and Y of a table (not shown) and to send them through an input/output port (not shown) to a table drive unit, thereby to position the table. Incidentally, although not shown in FIG. 1, the constructions existing on the route from the input/output port 102g to the servomotor 105 are also provided for the X and Y axes. Likewise, the processor 102a prepares the Z-axis moving command Zc and sends out the M, S and T function commands to the machine through the input/output port 102g. The moving command Zc thus sent out is outputted through the bus 102j to the input/output port 102g. When the moving command is given from the input/output port 102g to the pulse distributor 103, this pulse distributor 103 executes the pulse distributing arithmetic on the basis of the moving command Zc and outputs the distributed pulses Ps. The acceleration/deceleration circuit 104 receives those distributed pulses Ps and accelerates or decelerates them to input the command pulse train Pi to the error computing memory 107. As a result, the content of the error register 107b leaves its zero state, and a voltage is outputted from the DA converter 108 so that the motor 105 is driven by the speed control circuit 109 to drive the operating axes. If the motor 105 rotates through a predetermined interval (e.g., one revolution), the feedback pulses FP are generated from the pulse coder 106 and inputted to the error computing memory 107, so that the error register 107b stores the error Er between the number of the command pulses Pi and the number of the feedback pulses FP. From then on, moreover, the motor 105 is servo-controlled to drop the error Er to zero so that the operating axes are driven to target positions.

Thus, in the servo-positioning operation, the present position is specified by the counter 102h by making use of the feedback pulses FP from the pulse coder 106, and is used for the position control. This pulse coder 106 has such a high resolving accuracy as to conduct highly accurate position control, so that it is superior as a position controlling detector to other detectors such as resolvers.

Since the pulse coder 106 does not have an absolute position detecting function, however, it is necessary to conduct returns to a zero point when the absolute positions of the operating axes are lost (for example, when the servo-system is malfunctioning or when a power supply circuit is turned off. Since returns to the zero point accordingly complicate the control and take a longer time period, there has been desired a system which is capable of conducting absolute position detections without any zero point return.

For this desired system, an absolute encoder and a resolver are known as the position detector capable of detecting absolute position. The absolute encoder outputs the absolute position corresponding to the rotational angle of the operating axis. As shown in FIG. 2, on the other hand, the resolver is composed of: a rotor 202a; a rotor winding 202b; two stator windings 202c and 202d arranged with a phase difference of 90 degrees; and carrier generators 202e and 203f for generating carriers of sin ωt and cos ωt, respectively. Now, if it is assumed that the rotor 202a is in a position of an angle $\theta$, a voltage 3, as expressed by the following equation, is outputted from the rotor winding 202b:

$$e = \sin(\omega t + \theta) \quad (1).$$

The relationship between the carrier sin ωt and the output e of the resolver 202 is shown as in FIG. 3, so that the absolute position can be detected if phase differences $\theta_1$ to $\theta_n$ from the carrier sin ωt are determined.

Even if such position detector as can detect the absolute position is used in the servo-system under consideration, however, the full stroke of the moving part to have its position detected is generally achieved by n (e.g., 100) number of revolutions of the motor. Therefore, the resolution is one nth (i.e., 1/n) for one motor revolution, so that a sufficient positional accuracy cannot be attained. There is another problem in that, unless the high resolution of the pulse coder is accompanied by the detecting accuracy of the absolute position, it is not possible to improve the accuracy in the positional control. The servosystem also has a defect in that the detection of the respective absolute positions of a plurality of operating axes requires detecting circuits for the respective axes, so that its production cost is raised.

SUMMARY OF THE INVENTION

It is, therefore, an object of the present invention to provide an absolute position detecting system for a servocontrol system, which is capable of detecting highly accurately the absolute positions of operating axes and of executing the detection of the absolute positions of the respective axes by means of a commonly usable detecting circuit.

According to the present invention, there is provided an absolute position detecting system for a servocontrol system for servo-controlling a servomotor for driving operating axes, comprising: resolvers and absolute encoders both adapted to detect rotational positions in accordance with the revolutions of respective servomotors of a plurality of operating axes and to revolve at a ratio of 1:m; a detecting circuit for detecting absolute positions from the detected outputs of said resolvers and the detected outputs of said absolute encoders; and a switch so provided for switching to connect the plural resolvers and absolute encoders for the respective operating axes to said detecting circuit which is used commonly among said plural operating axes.

In the present invention, specifically, coarse position detections are conducted by the resolvers, whereas fine position detections are conducted by the absolute encoders, so that highly accurate absolute position detection can be made, and the detecting circuit for the absolute position is commonly used for the plural axes to make the construction simple and inexpensive.

DESCRIPTION OF THE PREFERRED EMBODIMENT

The present invention will be described in more detail in the following with reference to the accompanying drawings.

Figure 1:
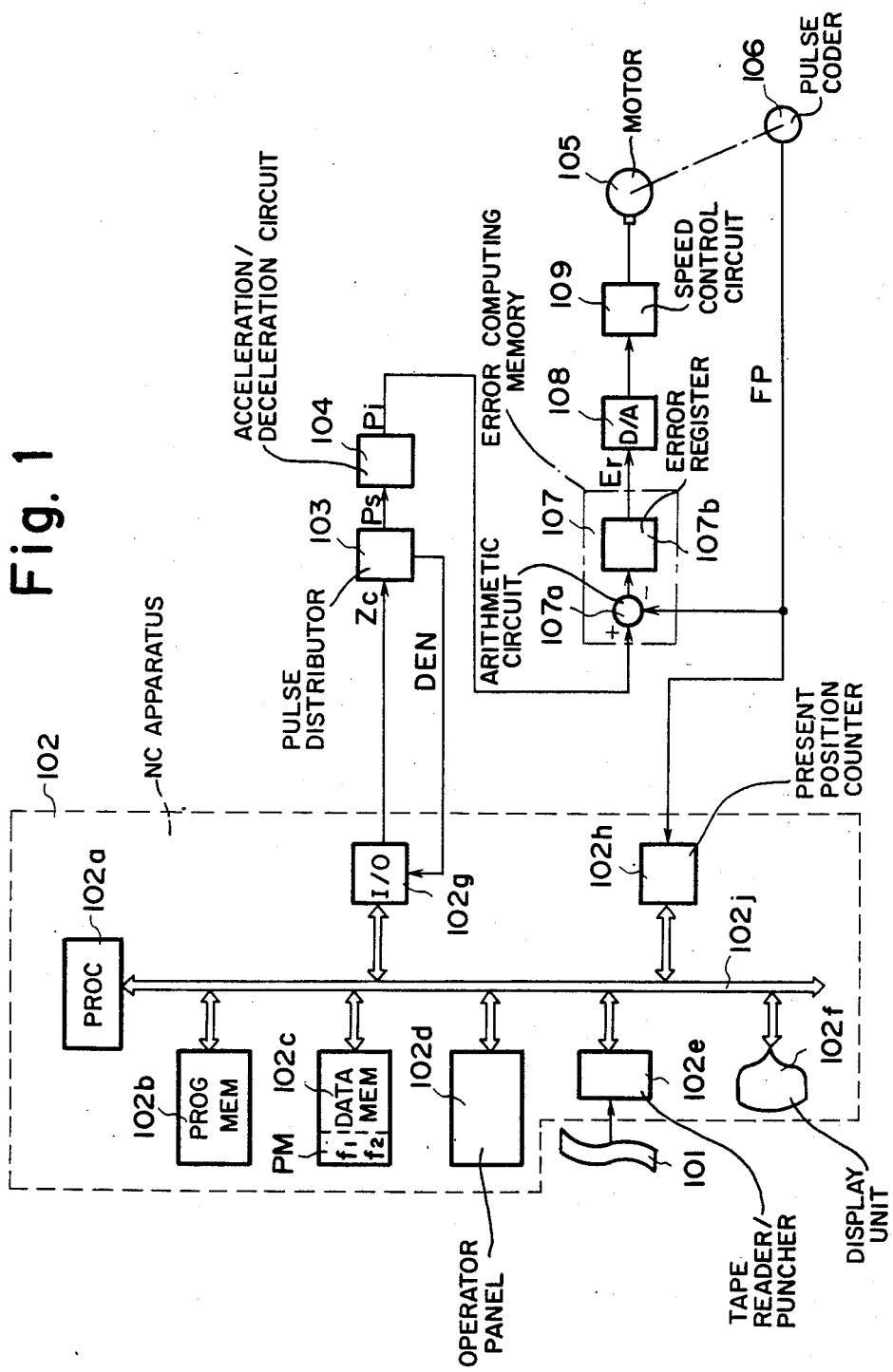
FIG. 1 is a block diagram showing a general servocontrol system.
Figure 2:
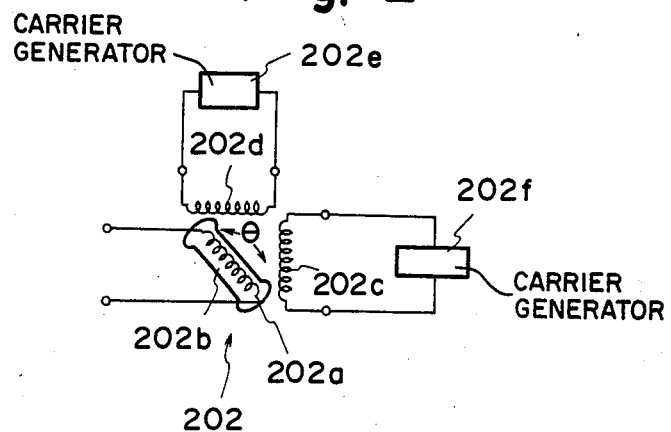
FIG. 2 is a schematic diagram of the construction of a resolver used in the present invention.
Figure 3:
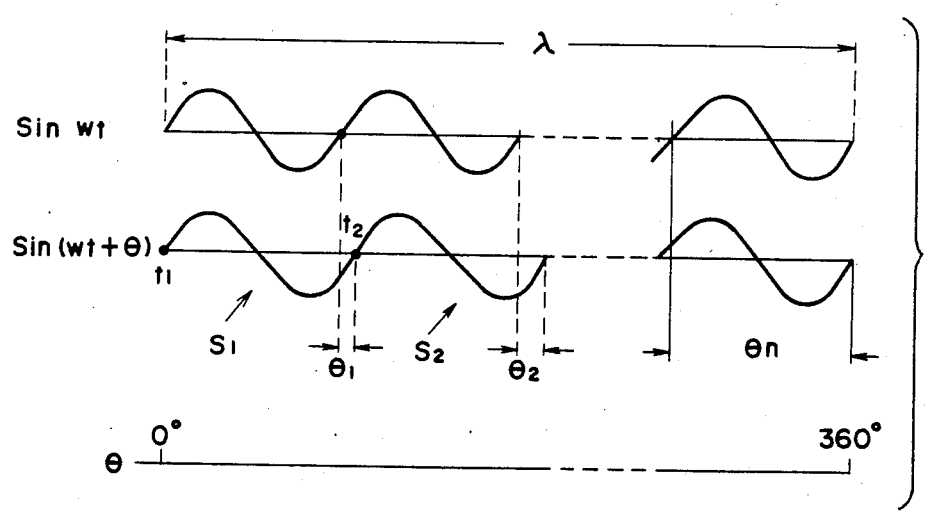
FIG. 3 is a chart showing the operations of the construction of FIG. 2.
Figure 4:
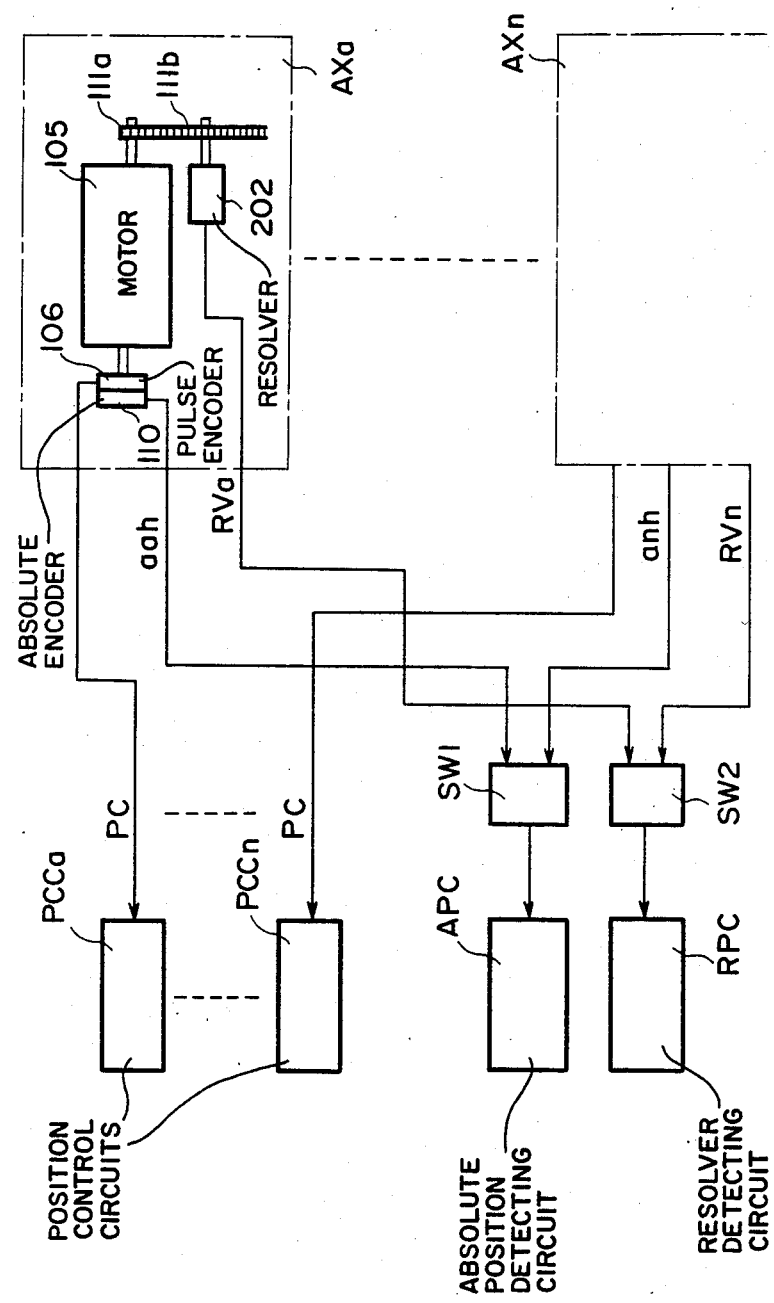
FIG. 4 is a block diagram of one embodiment of the present invention.
Figure 5:
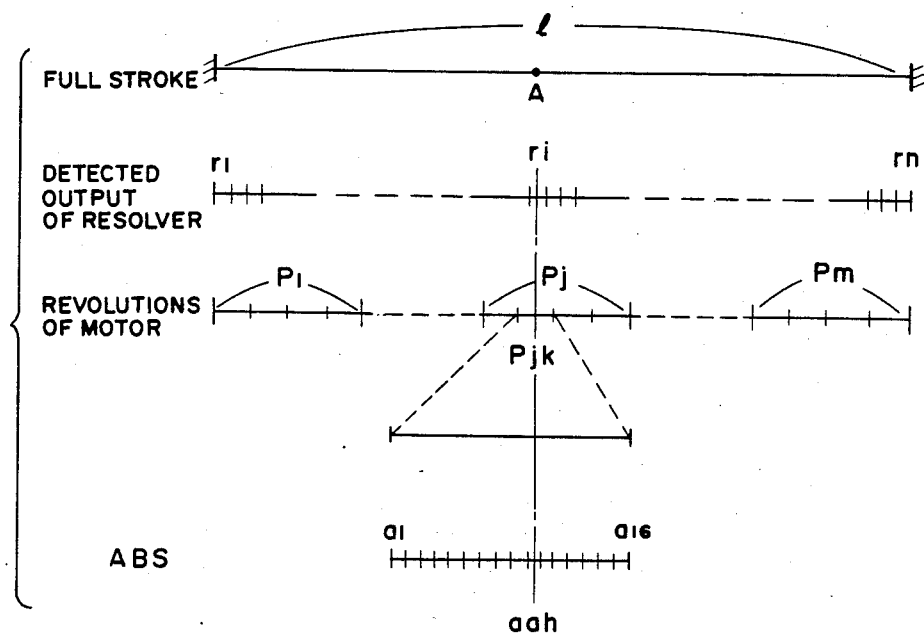
FIG. 5 is a chart for the operations of the construction of FIG. 4.

FIG. 4 is a block diagram of the construction of an embodiment of the present invention, and FIG. 5 is a chart for explaining the operations of same. In these Figures, parts identical to those of FIGS. 1 and 2 are indicated by identical reference characters. Indicated at numeral 110 is an absolute encoder which is composed of a disk connected together with the pulse encoder 106 which is connected directly to the rotating shaft of the motor 105 and formed on its circumference with characters (e.g., codes) corresponding to the rotational positions; and optical reading means for reading the codes in predetermined positions, or which may be integrated with the pulse coder 106. Indicated at numerals 111a and 111b are gears which are fixed on the rotating shafts of the motor 105 and a resolver 202, respectively, so that they may transmit the revolutions of the motor 105 to the resolver 202. As shown in FIG. 5, the full stroke of the moving part to be driven along the operating axis by the revolutions of the motor 105 is designated as l, and the number of revolutions of the motor required for the full stroke is designated as m (which need not be limited to an integer). The gear ratio of the gears 111a and 111b is so determined that the resolver 202 may make one revolution for the m number of revolutions of the motor 105. As a result, the resolver 202 makes one revolution for the movement at the full stroke. If the number of the operating axes is designated as n, the above-specified components are provided, as indicated at AXa to AXn in FIG. 4, for the servomotors of the respective axes. Indicated at letters PCCa to PCCn are position control circuits each containing the error computing memory 107, the DA converter 108 and the present position counter 102h, which are shown in FIG.

1. Letters RPC indicate a resolver detecting circuit for detecting a phase difference from a selected one of the outputs RVa to RVn of the resolver 202 to output a grid position ri, and letters APC indicate an absolute position detecting circuit for detecting each absolute position A from the grid position ri and a selected one of the outputs aah to anh of the absolute encoders 110. Indicated at characters SW1 and SW2 are switches, of which the switch SW1 switches the outputs aah to anh of the absolute encoders 110 of the respective axes to output one of them to the detecting circuit APC, whereas the switch SW2 switches the outputs RVa to RVn of the resolvers 202 of the respective axes to output one of them to the detecting circuit RPC.

Next, the detecting operations of the system shown in FIG. 4 will be described in the following with reference to the operation explaining chart of FIG. 5. Incidentally, in FIG. 5, the detecting operations of only one axis are shown for simplicity of explanation.

When the content of the present position counter 102h and the present position of the actual moving part are caused to become inconsistent with each other by a malfunction in the servo-system (i.e., when the present position is lost), the grid position is attained from the output RV of the resolver 202. Specifically, the detecting circuit RPC subtracts the mechanical angle $\alpha$ of the resolver 202 from the electrical angle $\theta$ of the output RV of the resolver 202 to compute the grid position ri. The resolver 202 has its mechanical angle $\alpha$ corresponding to the position of the point A because it makes one revolution for the m number of revolutions (corresponding to the movement of the full stroke l) of the motor 105, as has been described hereinbefore. If the resolution and the number of revolutions of the resolver 202 are designated as n and i, respectively, the grid position is expressed by the following equation:

$$ri = i \cdot l/n \qquad (2)$$

The resolution n of the resolver 202 is said to be 4,000 but has a large error, so that its actual value n is about 1,000.

Thus, the resolution is converted into the grid position of the absolute encoder 110.

Specifically, the absolute encoder 110 divides a one-quarter revolution into sixteen for each one-quarter revolution of the motor 105 to output corresponding absolute positions $a_1$ to $a_{15}$ in four bits. As a result, the absolute positions $a_1$ to $a_{15}$ are outputted for one revolution of the motor 105. Therefore, the grid position ri is converted into the grid position Pjk of the absolute encoder 110 of the ith revolution of the motor 105. This conversion can be easily conducted because the resolution n and the number m of revolutions of the motor 105 are known. More specifically, since the n/4m number of the grid positions ri of the resolver 202 corresponds to the width of the grid position Pjk of the absolute encoder 110, the ith grid position ri of the resolver 202 corresponds to the (i·4m/n)th grid position Pjk of the absolute encoder 110.

In these ways, the grid position Pjk is attained by the detecting circuit APC, and the absolute position of the point A is attained if the grid position Pjk is read out and combined with the detected output aah of the absolute encoder 110.

At this time, the absolute position x of the point A is given by the following equation:

$$x = ik \cdot (l/4m) + aah \cdot (l/4m) \cdot 16 \qquad (3)$$

As a result, the resolution takes a value of 64m for the resolution n of the resolver 202. If n=4,000 and m=100, a resolution obtained is 1.6 times (=6,400/4,000) as high as that of the resolver 202, and a resolution of 6.4 times as high as the actual resolution of the resolver is attained because the latter is actually about n/4. If the resolution attained is converted into the full stroke, the position can be detected at a step of about 1.5 mm. The absolute position x thus detected is set in the present position counter 102h.

In order to raise the resolution, moreover, it is sufficient to detect the absolute position, to subsequently apply the pulses to turn the motor 105 at a low speed in a predetermined direction, to stop the application of the pulses to the motor 105 at the edge of aah+1, where the detected output of the absolute encoder 110 is changed from aah to aah+1, and to replace the aforementioned aah by aah+1.

If this operation is conducted for the respective operating axes AXb to AXn by the switching operations of the switches SW1 and SW2, the absolute position detection for the respective operating axes can be conducted by each of the detecting circuits APC and RPC.

Figure 6:
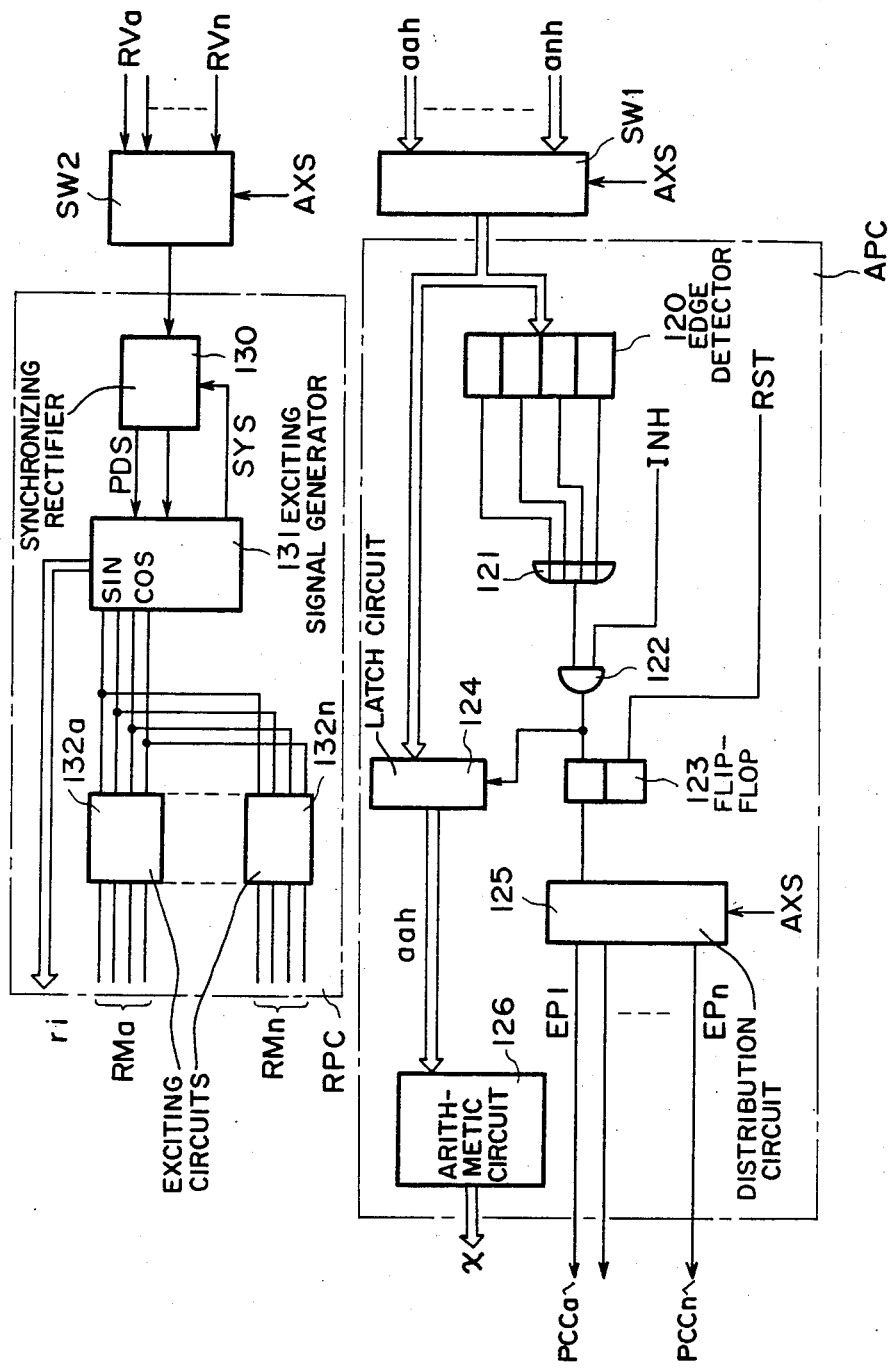
FIG. 6 is a block diagram of an essential portion of the construction of FIG. 4.

FIG. 6 is a block diagram of the essential portion of the construction of FIG. 4, i.e., a detailed block diagram of the resolver detecting circuit RPC and the absolute position detecting circuit APC. In FIG. 6: numeral 120 indicates an edge detector for detecting the edges of the respective bits of the absolute positions aah to anh of the absolute encoder 110; numeral 121 indicates an OR circuit for outputting the OR (logical sum) of the edge outputs of the edge detector 120; numeral 122 indicates an AND gate which is controlled by an inhibit signal INH; numeral 123 indicates a flip-flop for holding the edge output from the OR circuit 121; numeral 124 indicates a latch circuit for latching the absolute position signals aah to anh with the edge outputs of the OR circuit 121; and numeral 125 indicates a distribution circuit for distributing the output of the flip-flop 123 selectively as revolution signals EP1 to EPn in response to an axis selection signal AXS. Numeral 126 indicates an arithmetic circuit for computing the absolute position x.

Numeral 130 indicates a synchronizing rectifier for synchronizing and rectifying the error voltages RVa to RVn outputted from the resolver 202 to output the phase difference in the form of detection pulses PDS; numeral 131 indicates an exciting signal generator for counting the detection pulses PDS to detect the grid position ri, and for generating corresponding resolver exciting signals RM; and characters 132a to 132n indicate exciting circuits for applying the resolver exciting signals RMa to RMn to the resolvers 202 of the respective axes.

Next, the operations of the construction of FIG. 6 will be described in the following.

First of all, in order to detect the absolute positions, the axis selection signal AXS is generated, and the outputs RV of the resolvers 202 of the corresponding axes a to n and the absolute position outputs of the absolute encoders 110 are selected by the switches SW1 and SW2. If the a axis is selected, for example, the output RVA and the output aah are inputted from the switch SW2 and the switch SW1, respectively. The resolver output RVa from the switch SW2 is synchronized and rectified by the synchronizing rectifier 130 in response to a synchronism signal SYS, so that the detection pulses PDS according to the phase differences are outputted. These detection pulses PDS are counted by the counter of the exciting signal generator 131, and the exciting signal RMa, which is composed of sine waves SIN and cosine waves COS having an electrical angle corresponding to the counted value, is generated and given through the exciting circuit 132a to the resolver 202 of the a axis. The output RVa of the resolver 202 corresponding to that exciting signal RMa is likewise inputted again to the switch SW2, and the counted value of the counter is sequentially increased together with the electrical angle until the detection pulses are not outputted from the synchronizing rectifier 130. In this state, the mechanical angle and the electrical angle of the resolver 202 become coincident so that the content of the counter exhibits the grid position ri.

On the other hand, the output aah of the absolute encoder 110 is sent through the switch SW1 to the edge detector 120, so that the edge detection of each bit of the output aah is conducted. During this edge detection, the position control circuit PCCa of the a axis turns the motor 106, as has been described hereinbefore. When the edge detection output (i.e., the edge at the rise or break of al+1 after transfer from al to al+1) is generated from the edge detector 120, it sets the flip-flop 123 through the OR circuit 121 and the AND gate 122. This edge output is outputted as the revolution signal EP1 of the a axis by the distribution circuit 125 and is sent to the position control circuit PCCa to stop the revolution of the motor 105. The absolute position output aah of the absolute encoder 110 at this time is latched by the latch circuit 124. The arithmetic circuit 126 converts the aforementioned grid position ri into the grid position Pjk of the absolute encoder 110 to compute the absolute position x from the output aah of the latch circuit 124 by the equation (3), and sets it in the present position counter of the position control circuit PCCa.

If the outputs RVb, - - -, and RVn, and abh, - - -, and anh of the b, c, - - -, and n axes are likewise selected by the axis selection signal AXS, the absolute positions of the absolute axes are determined.

Since the present embodiment adopts the absolute position detecting system thus far described, there can be attained an advantage in that the actual resolution of the resolver can be improved to a value of 6.4 times high, so that the detection can be conducted at a step of 1.5 mm by converting that resolution into the full stroke of the operating axes. Thus, the function of the numerical control system as a whole can be improved by the highly accurate position control of the servomotor.

Moreover, the present embodiment comprises: a detecting circuit for detecting absolute positions from the detected outputs of said resolvers and the detected outputs of said absolute encoders; and a switch so provided for switching to connect the plural resolvers and absolute encoders for the respective operating axes with said detecting circuit, so that said detecting circuit is used commonly among said plural operating axes. As a result, it becomes unnecessary to provide a detecting circuit for each of the operating axes, so that the construction can be simplified and provided at a low cost. Since the position controlling accuracy of the servocontrol system is not degraded, still moreover, highly accurate positioning can be made. In case an AC servomotor is used as the servomotor, the present embodiment can be achieved merely by adding the resolvers because the absolute encoders are included by nature.

As has been described hereinbefore, according to the present invention, the resolvers and absolute encoders made rotatable with the servomotor are revolved at the predetermined ratio so that the absolute positions of the operating axes are detected highly accurately from the outputs of the two, and so that the circuits for those detections are used commonly for the respective operating axes. As a result, the present invention can be used effectively for controlling an NC machining tool or the like, and this control can be practised with ease and at a low cost.

What we claim is:

1. An absolute position detecting system for a servo-control system for servo-controlling servomotors for driving respective operating axes, comprising:
   resolvers for respectively detecting coarse rotational positions of servomotors for plural operating axes in accordance with the revolutions of the servomotors;
   absolute encoders for respectively detecting fine rotational positions of the servomotors for plural operating axes in accordance with the revolutions of the servomotors, said resolvers and said absolute encoders revolving at a ratio of 1:m;
   a detecting circuit for detecting absolute positions of the servomotors from the detected outputs of said resolvers and the detected outputs of said absolute encoders; and
   a switch, coupled between said detecting circuit and said resolvers and said absolute encoders, for switching to connect a selected one of said resolvers and a selected one of said absolute encoders for a selected one of the operating axes to said detecting circuit, so that said detecting circuit is used commonly for the plural operating axes.

2. An absolute position detecting system according to claim 1, wherein the revolving ratio of 1:m of said resolvers and said absolute encoders is selected such that m>1.

3. An absolute position detecting system according to claim 1, wherein said detecting circuit comprises a memory circuit for setting edge-detected outputs of the detected outputs of said absolute encoders, so that the servomotors may be stopped by the output of said memory circuit.

4. An absolute position detecting system according to claim 2, wherein said detecting circuit comprises a memory circuit for setting edge-detected outputs of the detected outputs of said absolute encoders, so that the servomotors may be stopped by the output of said memory circuit.

* * * * *